United States Patent
Willis

[11] Patent Number: 5,236,294
[45] Date of Patent: Aug. 17, 1993

[54] METHOD AND MEANS FOR TRANSPORTING BALES

[76] Inventor: Ronald K. Willis, R.R., Box 25A, Davis City, Iowa 50065

[21] Appl. No.: 793,140

[22] Filed: Nov. 18, 1991

[51] Int. Cl.$^5$ .................... A01D 90/00; B60P 1/02
[52] U.S. Cl. .................... 414/24.5; 414/25; 414/459; 414/495; 414/540; 414/786; 180/89.13
[58] Field of Search .......... 414/24.5, 24.6, 25, 414/459, 460, 461, 495, 540, 545, 786; 180/89.13, 327, 152; 280/43.23, 43.24, 790

[56] References Cited

U.S. PATENT DOCUMENTS

| | | | |
|---|---|---|---|
| 3,398,984 | 8/1968 | Ajero | 180/89.13 |
| 3,776,356 | 12/1973 | France | 180/79.2 |
| 3,884,321 | 5/1975 | Drake et al. | 180/89 R |
| 3,957,165 | 5/1976 | Smith | 180/89 R |
| 4,042,140 | 8/1977 | McFarland | |
| 4,072,241 | 2/1978 | Parker et al. | |
| 4,076,137 | 3/1978 | Kucera | 414/24.5 |
| 4,204,790 | 5/1980 | Baxter | 414/24.5 |
| 4,248,561 | 2/1981 | Graves | |
| 4,390,312 | 6/1983 | Skeem | 414/24.6 |
| 4,396,330 | 8/1983 | Rozeboom | 414/24.5 |
| 4,396,331 | 8/1983 | Forster | 414/24.6 |
| 4,773,806 | 9/1988 | Beaulieu | 414/24.5 |

Primary Examiner—Michael S. Huppert
Assistant Examiner—Stephen T. Gordon
Attorney, Agent, or Firm—Zarley, McKee, Thomte, Voorhees, & Sease

[57] ABSTRACT

A hay bale transport has a frame consisting of a plurality of spaced inverted U-shaped frame members which are secured together in spaced parallel relation by elongated beams extending along the lower ends thereof. An elongated longitudinal alley space exists within the frame for receiving a plurality of bales to be transported. Spaced elongated bale supporting rails extend within the frame and are secured to the beams. Wheels are secured to the frame and are connected to a power unit for raising or lowering the frame with respect to a ground surface whereby bales within the alley can be raised or lowered with respect to the ground surface. An operating cab is movably secured to one of the inverted U-shaped frame members and is normally positioned within the alley, but is connected to another power unit so that the cab can be laterally moved out of the alley while the bales are being picked up, transported, and discharged.

12 Claims, 6 Drawing Sheets

METHOD AND MEANS FOR TRANSPORTING BALES

BACKGROUND OF THE INVENTION

Large round bales of hay weigh between 1500 and 3000 pounds, depending on the size of the baler used. After the bales are created, it is necessary to gather them from the hay fields and remove them to a storage area for subsequent feeding to livestock.

A plurality of hay transport trailers exist, but it is often difficult to load and unload the large round bales from these trailers. Existing trailers often have to be adjusted laterally to squeeze or otherwise grasp the bales, and commonly involve a plurality of moving parts.

It is therefore a principal object of this invention to provide a method and means for transporting bales wherein a large number of bales can be quickly picked up from the field, transported to a storage location, and quickly discharged from the bale transport mechanism.

A further object of this invention is to provide a method and means for transporting bales which substantially avoids the steps of adjusting the bale carrying mechanism to grasp he bales being transported.

A still further object of this invention is to provide a method and means for transporting bales wherein the mechanism is self-propelled, and wherein the control cab for the mechanism can be moved to an out of the way operating position when the bales are being gathered and transported.

These and other objects will be apparent to those skilled in the art.

BRIEF SUMMARY OF THE INVENTION

The hay bale transport of this invention comprises a frame consisting of a plurality of spaced inverted U-shaped frame members which are secured together in spaced parallel relation by elongated beams extending along the lower ends thereof. An elongated longitudinal alley space exists within the frame for receiving a plurality of bales to be transported. Spaced elongated bale supporting rails extend within the frame and are secured to the beams. Wheels are secured to the frame and are connected to power means for raising or lowering the frame with respect to a ground surface whereby bales within the alley can be raised or lowered with respect to the ground surface.

An operating cab is movably secured to one of the inverted U-shaped frame members and is normally positioned within the alley, but is connected to power means so that the cab can be laterally moved out of the alley while the bales are being picked up, transported, and discharged.

DESCRIPTION OF THE PREFERRED EMBODIMENT

Figures 1, 8:
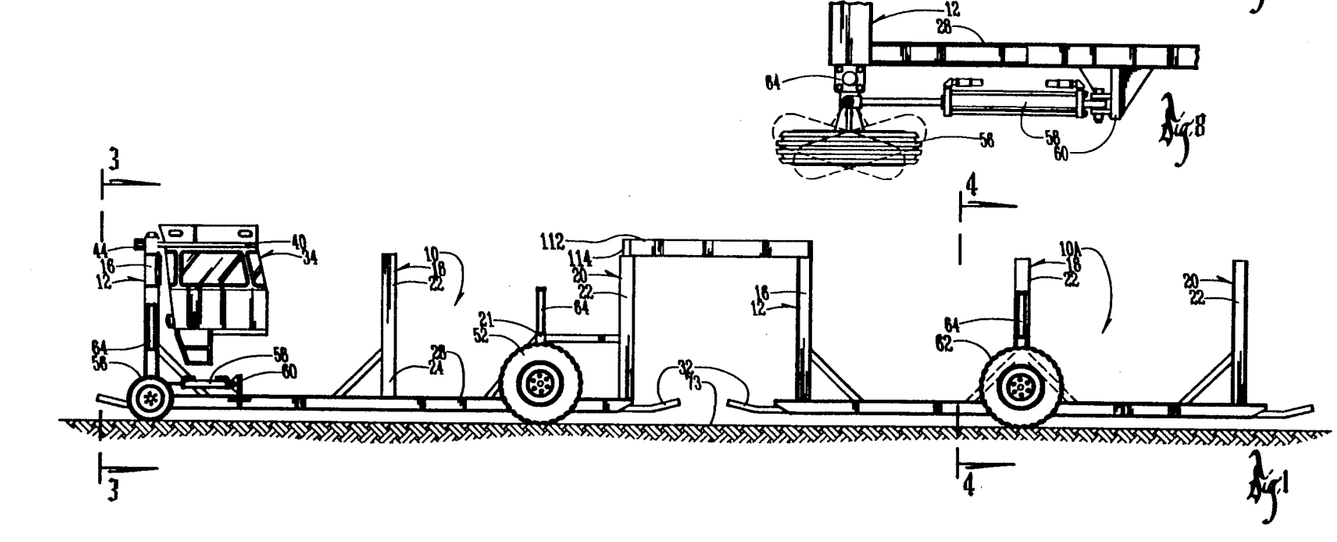
FIG. 1 is a side elevational view of a self-propelled wheel mounted transport frame with a similar towable frame connected thereto in tandem relation.
FIG. 8 is a partial plan view of one of the forward steering wheels of the self-propelled transport frame shown in the lower left hand corner of FIG. 2.
Figure 2:
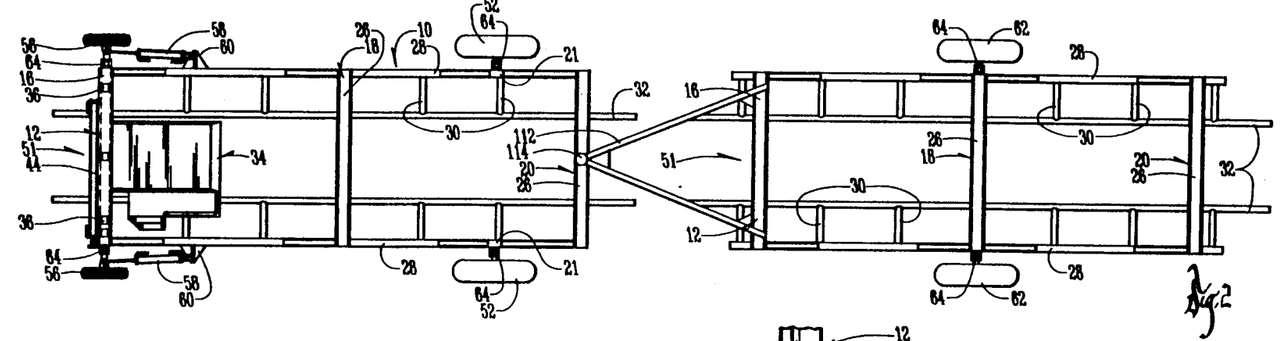
FIG. 2 is a plan view of the device of FIG. 1.

With reference to FIGS. 1 and 2, the numeral 10 designates the self-propelled trailer frame, and the numeral 10A designates the towable trailer frame of similar construction. Like parts of the trailer frames 10 and 10A will be designated by identical numerals, with the description of frame 10 being applicable to the frame 10A insofar as similar components are present in each of the frames.

Figure 3:
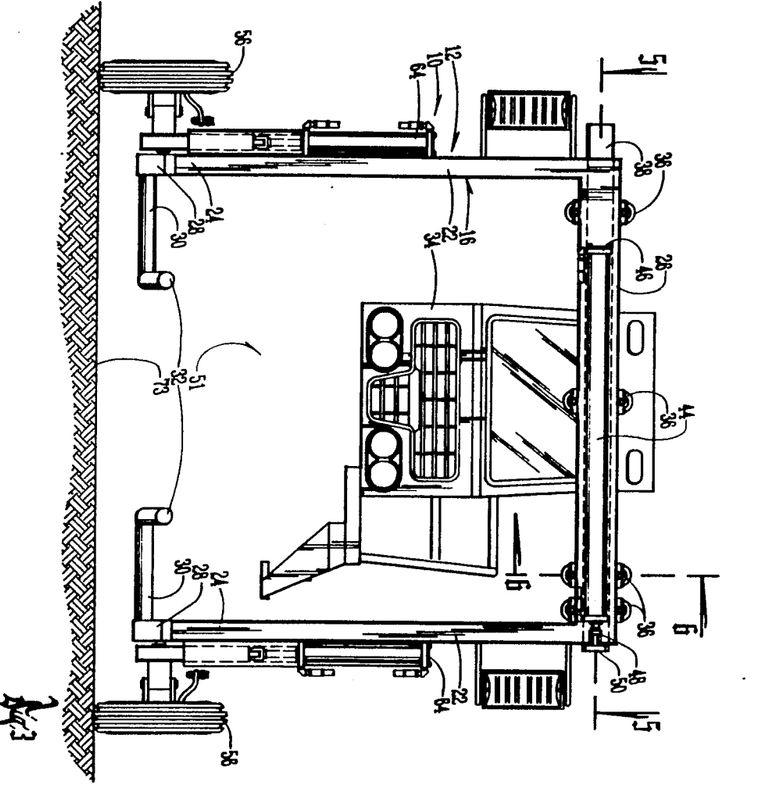
FIG. 3 is an enlarged scale forward end elevational view taken on line 3—3 of FIG. 1.
Figure 4:
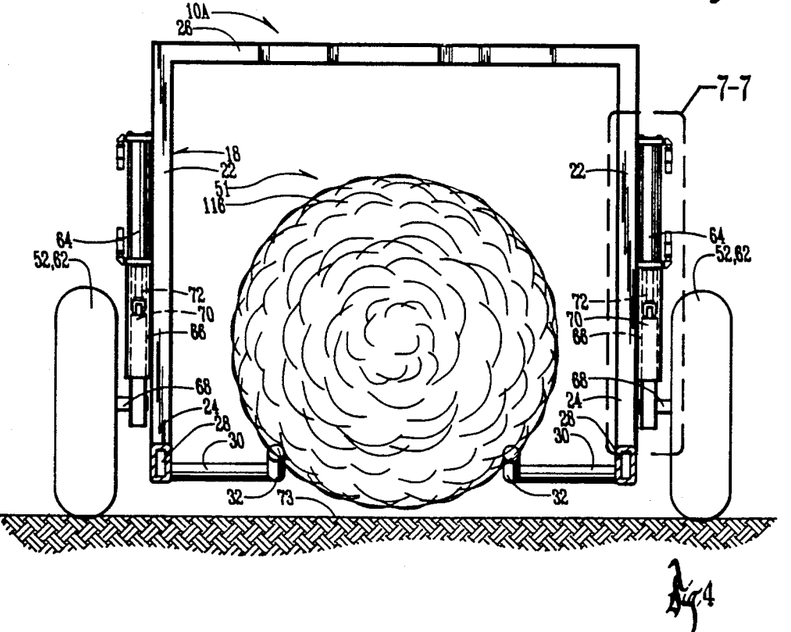
FIG. 4 is an enlarged scale sectional view taken on line 4—4 of FIG. 1.

The numeral 12 designates the forward end of frame 10 and the rearward end thereof is designated by the numeral 14. Frame 10 is comprised of a forward inverted U-shaped frame member 16; a similar center inverted U-shaped frame member 18; and a rearward inverted U-shaped frame member 20. Each of the frame members 16, 18, and 20 have side members 22 with lower ends 24, and a top member 26. These frame members are of rigid construction and require no adjustment. The frame members 16, 18, and 20 are secured together in parallel relation by longitudinal beams 28 which extend the full length of frame 10 and are secured to the lower ends 24 of the frame members. As shown in FIGS. 3 and 4, arms 30 are secured by one of their ends to the inward side of beams 28 and extend in a horizontal direction with the inner ends thereof being rigidly secured to elongated rails 32. Rails 32 extend in a longitudinal direction parallel to beams 28. The forward and rearward ends of rails 32 extend beyond the forward and rearward ends respectively of frame 10. Preferably, the forward and rearward ends of rails 32 are bent slightly upwardly.

Figures 6, 7:
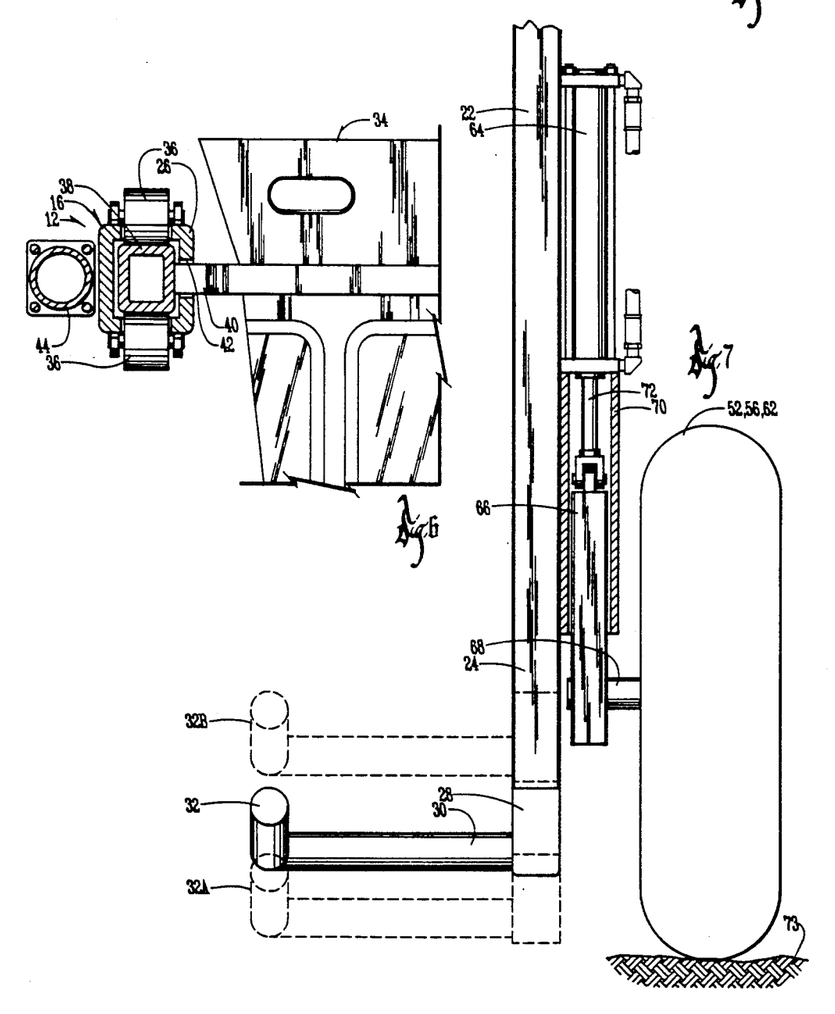
FIG. 6 is an enlarged scale sectional view taken on line 6—6 of FIG. 3.
FIG. 7 is an enlarged scale sectional view of the portion of FIG. 4 denoted by the lines 7—7.

An operating cab 34 is mounted on the top member 26 of frame member 16 of frame 10 (FIGS. 3 and 6). Rollers 36 are mounted on the upper and lower portions of top member 26 and extend through suitable openings in member 26 as best shown in FIG. 6. An elongated roller beam 38 is mounted within top member 26 and is laterally movable by reason of the supporting engagement of rollers 36.

Support arms 40 are welded or otherwise secured to roller beam 38 and extend outwardly through top member 26 through a suitable elongated slot 42. Support arms 40 are rigidly secured to cab 34.

Figure 5:
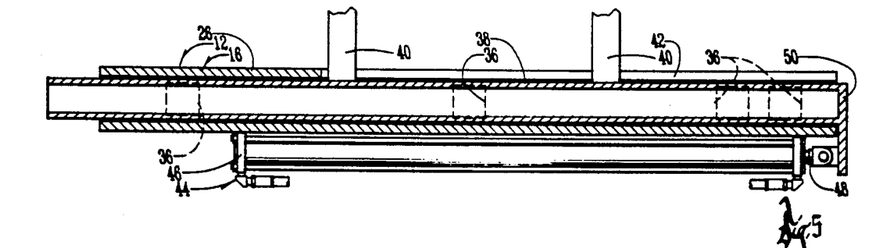
FIG. 5 is an enlarged scale sectional view taken on line 5—5 of FIG. 3.

As shown in FIG. 5, an elongated cylinder is secured to the top member 26 at 46 by welding or the like. A piston rod 48 protrudes from cylinder 44 in conventional fashion and is secured to bracket 50 on the end of roller beam 38. When the piston rod 48 is extended from cylinder 44, roller beam 38 is laterally extended out of top member 26 whereupon cab 34 is moved laterally outside the internal space of frame 10. The internal space of frame 10 comprises an elongated alley 51.

Figure 9:
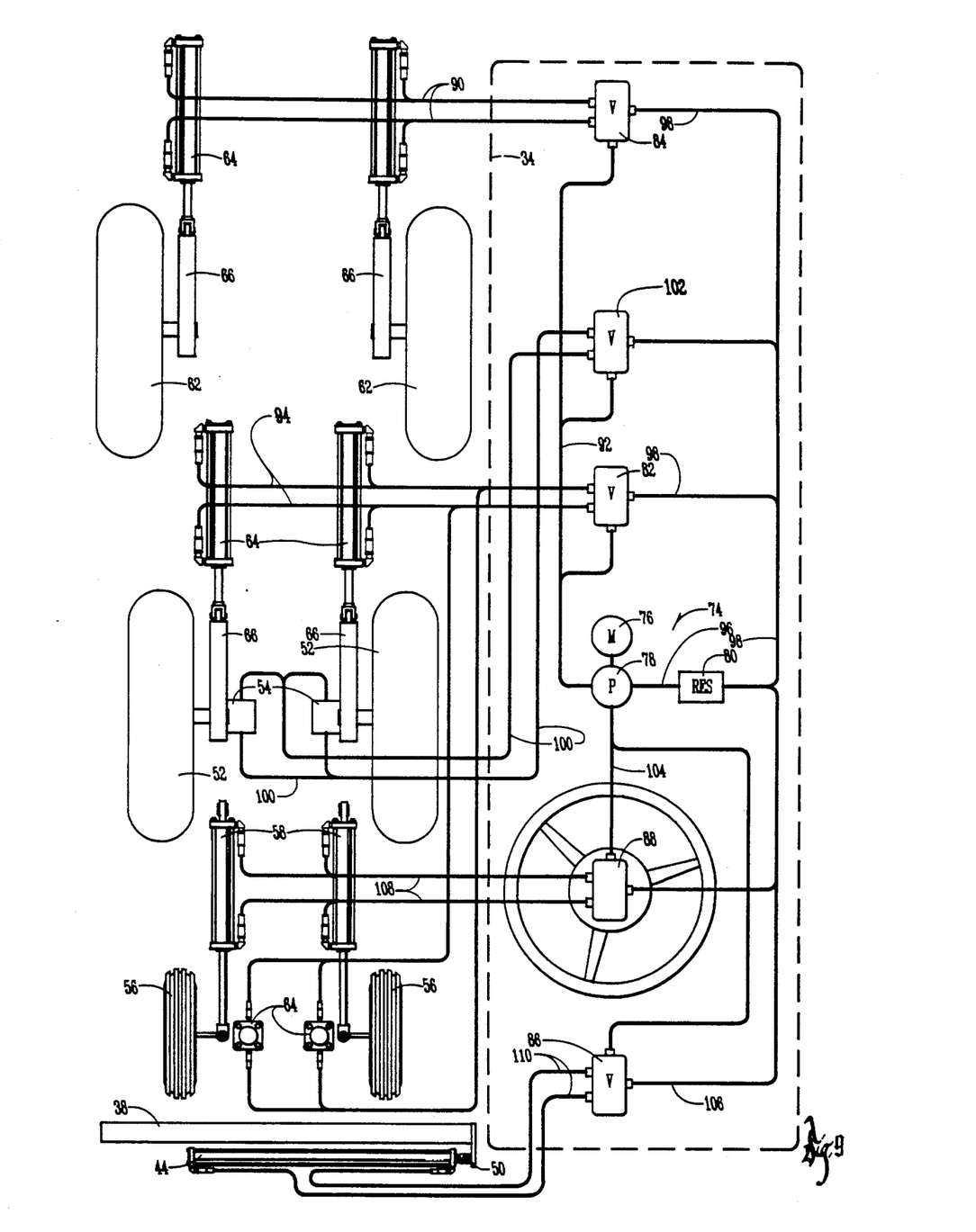
FIG. 9 is a schematic hydraulic diagram of the hydraulic controls of the device of this invention.

Drive wheels 52 on frame 10 are driven by hydraulic motors 54 (FIG. 9). The steering wheels 56 on the forward end of frame 10 are controlled by steering cylinders 58 which are secured to beams 28 by means of brackets 60 (FIG. 8). Wheels 62 on frame 10A are similar to the wheels 52 on frame 10 except that wheels 62 are not self-propelled.

FIG. 7 shows the mechanism whereby the frames 10 and 10A can be raised and lowered with respect to wheels 52, 56 and 62 respectively. While wheel 52 is mounted on post 21, FIG. 7 shows the typical manner in which hydraulically powered wheel assemblies are connected to the frames 10 and 10A. The hydraulic motors 54 connected to wheels 52 have been omitted from FIG. 7. Hydraulic cylinders 64 are secured to the side members 22 of the frame member 16 (or post 21 for wheel 52). Vertical arms 66 are connected to axles 68 and dwell within sleeve 70 which is also secured to the side members 22 directly below cylinder 64. A piston rod 72 extending from cylinders 64 is secured to the upper end of arm 66. As shown in FIG. 7, the extension of piston rod 72 lowers the wheel 52, 62 to a lower position with respect to frame 10, and the retraction of piston rod 72 raises the wheel 52, 62 with respect to the frame. Thus, the rails 32 can be moved from a position substantially upon the ground surface 73 (see dotted lines 32A) to an elevated transport position shown by the dotted lines 32B in FIG. 7.

The hydraulic control circuit 74 is shown schematically in FIG. 9. All of the controls for hydraulic 74 are present in cab 34. The numeral 76 designates an internal combustion engine which drives hydraulic pump 78 which in turn is connected to hydraulic fluid reservoir 80. Valve 82 controls cylinders 64 so that the wheels 52 and 56 on frame 10 can be raised and lowered. Similarly, valve 84 is connected to cylinder 64 on frame 10A so that the wheels 62 can be selectively raised or lowered.

Valve 86 controls cylinder 44 so that cab 34 can be selectively moved in the lateral direction as will be described hereafter. Valve 88 controls the steering cylinders 58.

Hydraulic lines 90 connect valve 84 with cylinders 64. Hydraulic lines 92 connect pump 78 to valves 82 and 84. Hydraulic line 94 connects valve 82 with cylinders 64. Hydraulic line 96 connects pump 78 to the reservoir 80. Hydraulic line 98 is a return line which connects the reservoir 80 with valves 82 and 84. Hydraulic line 100 connects hydraulic line 92 to control valve 102 and hydraulic motors 54. Valve 102 controls the speed of hydraulic motors 54.

Hydraulic line 104 connects pump 78 to valves 86 and 88. Hydraulic line 106 is a return line and connects the reservoir 80 to valves 86 and 88. Hydraulic line 108 connects valve 88 with cylinders 58 which control the steering of wheels 56. Hydraulic line 110 connects valve 86 with cylinder 44.

Frame 10A has an elevated tongue 112 which extends forwardly from the top member 26 of frame member 16. It is adapted to be pivotally connected to a tongue connector 114 on the center of the top member 26 on the frame member 20 of frame 10. By being in an elevated position, tongue 112 can be used to permit frame 10A to be towed by frame 10 without interfering with the alleys 51 of either frames 10 or 10A.

Figures 10, 11:
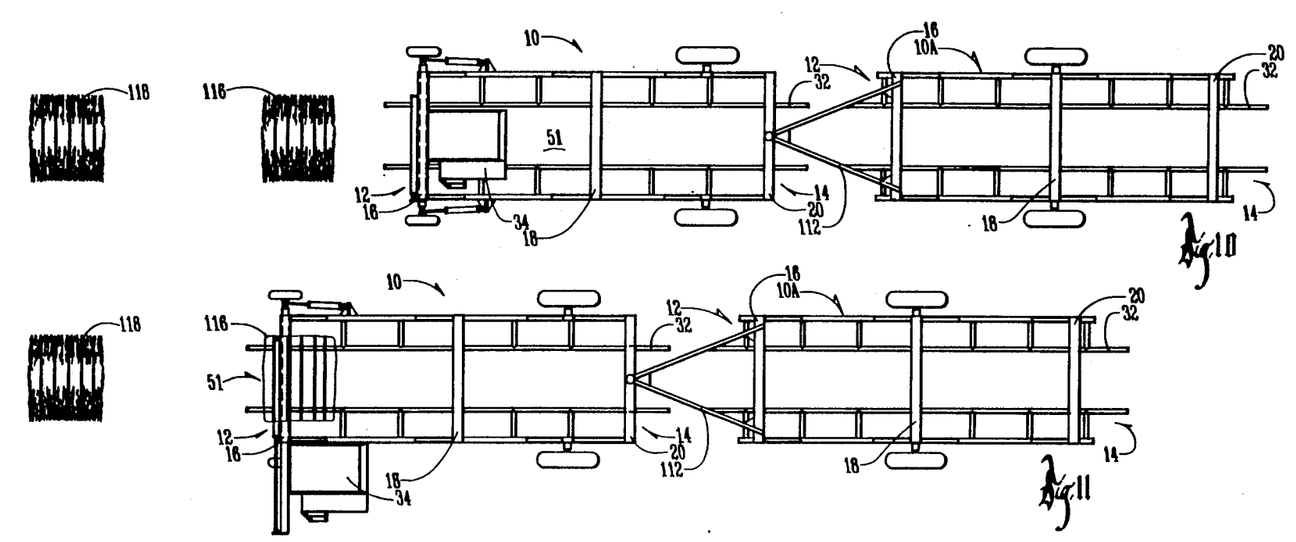
FIGS. 10-15 are plan views of the apparatus of FIG. 2 showing the sequence of events as the apparatus sequentially picks up a plurality of bales.

The method of operation of the device of this invention is schematically shown in FIGS. 10-15. With reference to FIG. 10, the self-propelled frame 10 is connected to frame 10A in the manner described and is driven to a position of alignment with a first bale 116. Cylinder 44 is actuated to move cab 34 to its offset position as shown in FIG. 11, and the frame 10 is then driven forwardly to envelop the bale 116. As this is done, the wheels 52 have been raised so that the rails are in the position of rails 32A as shown in FIG. 7. This permits the rails to engage the lower periphery of the bale 116 as best shown in Fig. 4. The cylinder 64 can thereupon be actuated to raise the bale 116 to a slightly elevated condition as shown in FIG. 4 so that the bale does not touch the ground surface 73.

Figure 12:
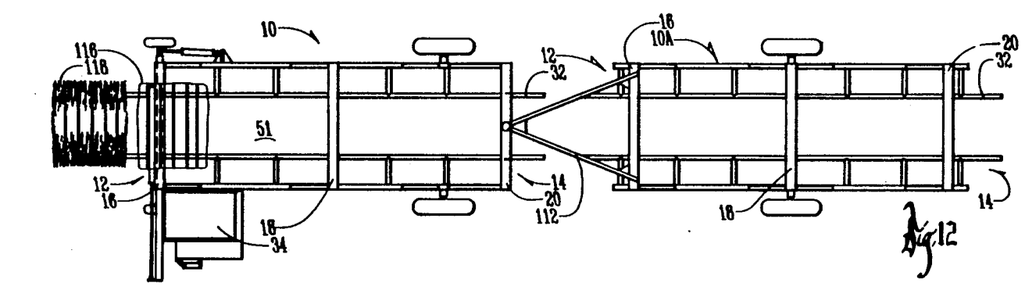

The above described process is repeated (except that cab 34 can remain in its offset position) whereupon frame 10 is moved to engage and receive a second bale 118 as best shown in FIG. 12. It can be seen that the second bale 118 engages the first bale 116 and pushes bale 116 to a rearward position as best shown in FIG. 13.

Figures 13, 14:
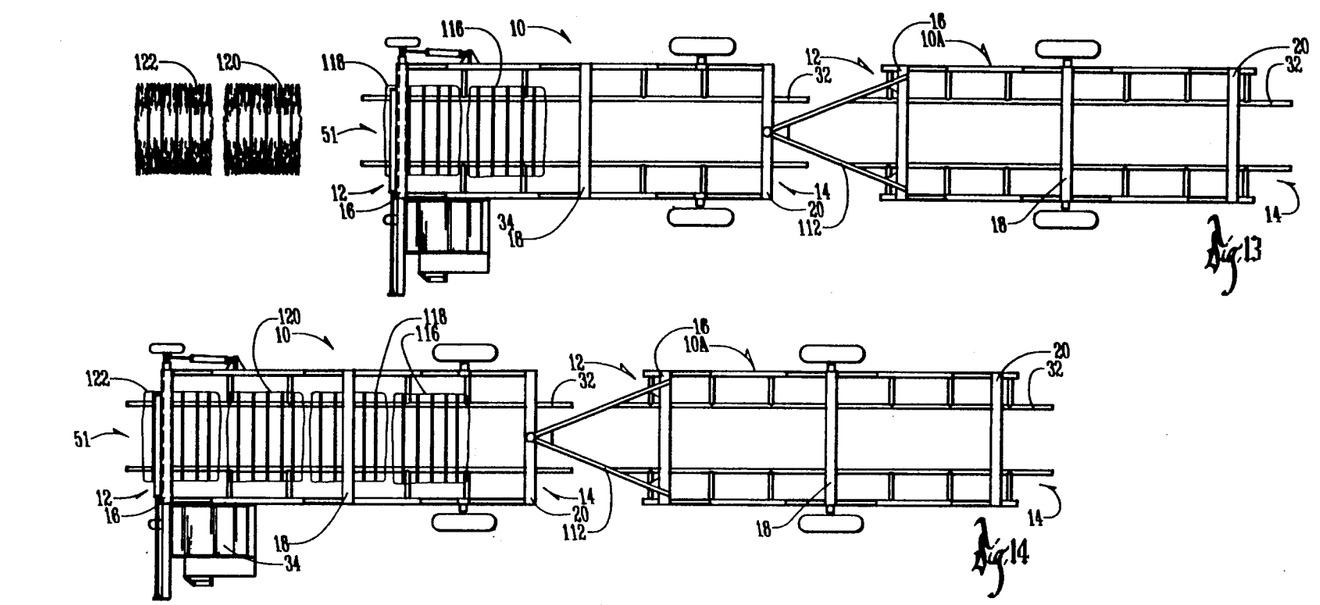
Figure 15:
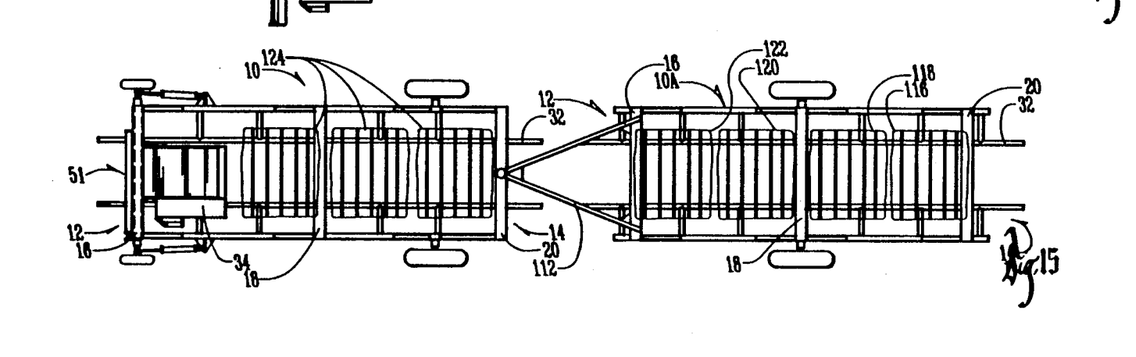

The process is continued and repeated with respect to bales 120 and 122 (FIG. 13) whereupon frame 10 is substantially filled with bales as shown in FIG. 14. The process can be continued with bales 124 whereupon the bales 116-122 are moved rearwardly to frame 10A and frame 10 contains the last three bales 124. The cylinder 44 can then be actuated to cause cab 134 to move back to its normal position as shown in FIG. 15, and the frames 10 and 10A can be moved to a storage location. Normally, the cylinder 64 is actuated so that the wheels 52, 56 and 62 are in the raised position so that the rails 32 are in the position of 32B as shown in FIG. 7 during the transport mode.

The bales are unloaded from either of the frames 10 or 10A by lowering the rails to the position of 32A in FIG. 7 which permits the bales to actually rest on the ground. The frames 10 and 10A are then moved forwardly which in effect removes the rails 32 from underneath the bales, and the bales thereupon are released through the rearward ends of the frames as the frames pass over the stationary bales.

From the foregoing, it is seen that this invention provides an apparatus and a method for quickly and efficiently loading, transporting, and unloading a plurality of heavy bales of hay. It is thus seen that this invention achieves at least its stated objectives.

I claim:

1. A hay bale transport, comprising
    a frame comprised of a plurality of spaced inverted U-shaped frame members of fixed construction and being vertically disposed and each having a top member and opposite spaced side members having lower ends,
    elongated beams fixedly secured to and supporting the lower ends of said side members of said inverted U-shaped frame members so that said inverted U-shaped frame members are secured together;
    a space within and between said inverted U-shaped frame members defining an elongated longitudinal bale alley adapted to receive a plurality of bales,
    spaced elongated bale supporting rails extending the substantial length of said frame and being secured to said beams in spaced parallel relation to said beams, the space between said rails being less than the normal width of a bale positioned within said alley said rails being adapted to engage the lower portion of a bale positioned within said alley,
    wheels secured to said frame,
    first power means for raising or lowering said frame with respect to said wheels whereby bales within said alley can be raised or lower with respect to a ground surface supporting said wheels, an operating cab secured to one of said inverted U-shaped frame members and being normally positioned within said alley, and third power means connected to said cab and the inverted U-shaped frame member to which said cab is secured for moving said cab out of said alley to permit free access to said alley by said bales.

2. The device of claim 1 wherein said frame has open forward and rearward ends to permit bales to be introduced into said alley through said forward end, and released from said alley through said rearward end.

3. The device of claim 1 wherein second power means is secured to said frame and connected to at least some of said wheels for rotating the same to longitudinally move said frame.

4. A hay bale transport, comprising a frame comprised of a plurality of spaced inverted U-shaped frame members of fixed construction and being vertically disposed and each having a top member and opposite spaced side members having lower ends, said frame having open forward and rearward ends to permit bales to be introduced into said alley through said forward end and released from said alley through said rearward end, elongated beams fixedly secured to and supporting the lower ends of said side members of said inverted U-shaped frame members so that said inverted U-shaped frame members are secured together, a space within and between said inverted U-shaped frame members defining an elongated longitudinal bale alley adapted to receive a plurality of bales, spaced elongated bale supporting rails extending the substantial length of said frame and being secured to said beams in spaced parallel relation to said beams, the space between said rails being less than the normal width of a bale positioned within said alley, said rails being adapted to engage the lower portion of a bale positioned within said alley, wheels secured to said frame, first power means for raising or lowering said frame with respect to said wheels whereby bales within said alley can be raised or lowered with respect to a ground surface supporting said wheels, second power means secured to said frame and connected to at least some of said wheels for rotating the same to longitudinally move said frame, an operating cab secured to one of said inverted U-shaped frame members and being normally positioned within said alley, and third power means connected to said cab and the inverted U-shaped frame member to which said cab is secured to move said cab out of said alley to permit free access to said alley by said bales.

5. A hay bale transport, comprising a frame comprised of a plurality of spaced inverted U-shaped frame members of fixed construction and being vertically disposed and each having a top member and opposite spaced side members having lower ends, said frame has open forward and rearward ends to permit bales to be introduced into said alley through said forward end, and released from said alley through said rearward end, elongated beams fixedly secured to and supporting the lower ends of said side members of said inverted U shaped frame members so that said inverted U-shaped frame members are secured together, a space within and between said inverted U-shaped frame members defining an elongated longitudinal bale alley adapted to receive a plurality of bales, spaced elongated bale supporting rails extending the substantial length of said frame and being secured to said beams in spaced parallel relation to said beams, the space between said rails being less than the normal width of a bale positioned within said alley, said rails being adapted to engage the lower portion of a bale positioned within said alley, wheels secured to said frame, first power means for raising or lowering said frame with respect to said wheels whereby bales within said alley can be raised or lowered with respect to a ground surface supporting said wheels, second power means secured to said frame and connected to at least some of said wheels for rotating the same to longitudinally move said frame, an operating cab secured to one of said inverted U-shaped frame members and being normally positioned within said alley, and third power means connected to said cab and the inverted U-shaped frame member to which said cab is secured to laterally move said cab out of said alley to permit free access to said alley by said bales.

6. The device of claim 4 wherein said cab is movably secured to the top member of one of said inverted U-shaped frame members.

7. The device of claim 2 wherein a towing connector is mounted on the top member of the inverted U-shaped frame member nearest to said rearward end of said frame.

8. A method of use of a hay bale transport having a frame comprises of a plurality of frame members and open forward and rearward ends, bale supporting rails, and an operating cab secured to one of said frame members and being normally positioned within an alloy defined by a longitudinal arrangement of said frame members, said method comprising the steps of:

lowering said frame so that said rails are moved to a position close to a ground surface;

moving said operating cab to a position out of said alley;

moving said frame forwardly and longitudinally with respect to a first bale resting on said ground surface to permit said bale to dwell within said alley and be supported on said rails at the forward end of said frame;

raising said frame and moving said frame to the location of a second bale supported on said ground surface;

repeating said aforementioned steps with respect to said first bale so that said second bale will dwell within said alley adjacent said first bale, with the forward motion of said frame causing said second bale to engage said first bale and push said first bale rearwardly on said rails; and repeating said aforementioned steps until a plurality of additional bales are positioned within said alley and supported on said rails.

9. The method of claim 8 wherein the bales within said alley are removed therefrom by lowering said frame so that said bales in said alley can engage said ground surface, and moving said frame forwardly to move said frame and said rails out of supporting relation to said bales with the rearward end of said frame passing over said bales to effect the discharge of sad bales from said alley through said rearward end of said frame.

10. A method of use of a hay bale transport having a frame comprises of a plurality of frame members, bale supporting rails, and an operating cab secured to one of said frame members being normally positioned within an alloy defined by a longitudinal arrangement of said frame members, and means connected to said operating cab for moving said cab out of said alley, said method comprising the steps of:

lowering said frame so that said rails are moved to a position close to a ground surface;

moving said operating cab out of said alley;

moving said frame forwardly and longitudinally with respect to a first bale resting on said ground surface to permit said bale to dwell within said alley and be supported on said rails at the forward end of said frame;

raising said frame and moving said frame to the location of a second bale supported on said ground surface;

repeating said aforementioned steps with respect to said first bale so that said second bale will dwell within said alley adjacent said first bale, with the forward motion of said frame causing said second bale to engage said first bale and push said first bale rearwardly on said rails; and repeating said aforementioned steps until a plurality of additional bales are positioned within said alley and supported on said rails.

11. The method of claim 10 wherein said cab is moved laterally.

12. The method of claim 10 wherein the bales within said alley are removed therefrom by lowering said frame so that said bales in said alley can engage said ground surface, and moving said frame forwardly to move said frame and said rails out of supporting relation to said bales with the rearward end of said frame passing over said bales to effect the discharge of said bales from said alley through said rearward end of said frame.

* * * * *